United States Patent [19]
Andersen et al.

[11] Patent Number: 5,553,977
[45] Date of Patent: Sep. 10, 1996

[54] OFF-SHORE PLATFORM CONSTRUCTION, AND METHOD FOR TRANSFERRING LOADS

[75] Inventors: William F. Andersen, San Jose, Calif.; Andrew B. Boyd; Russell L. Baldwin, both of Houston, Tex.; Bisuddha N. Datta, Katy, Tex.

[73] Assignee: Northrop Grumman Corporation, Los Angeles, Calif.

[21] Appl. No.: 357,954

[22] Filed: Dec. 16, 1994

[51] Int. Cl.$^6$ ...................................................... E02B 17/08
[52] U.S. Cl. ................................................ 405/204; 405/209
[58] Field of Search ................................... 405/204, 209, 405/205, 212

[56] References Cited

U.S. PATENT DOCUMENTS

| | | | |
|---|---|---|---|
| 4,408,930 | 10/1983 | Ninet et al. | 405/209 |
| 4,436,454 | 3/1984 | Ninet et al. | 405/204 |
| 4,604,940 | 8/1986 | Mendelsohn et al. | 89/1.816 |
| 4,607,982 | 8/1986 | Brasted et al. | 405/204 |
| 4,662,788 | 5/1987 | Kypke et al. | 405/204 |
| 4,848,967 | 7/1989 | Weyler | 405/204 |
| 5,219,451 | 6/1993 | Datta et al. | 405/204 |
| 5,403,124 | 4/1995 | Kocaman et al. | 405/209 |

OTHER PUBLICATIONS

"The Heidrun Field" Conoco Norway Inc. brochure, 1992 Edition.

*Primary Examiner*—Hoang C. Dang

[57] ABSTRACT

A method is described for using a particular spring element to facilitate the transfer of deck modules to a hull or jacket during the construction of an off-shore well platform. The spring element not only absorbs energy from the compressive loading expected during the transfer, but also resists any shear loading caused by relative motion between the module and the jacket or hull caused by the operation being performed in a body of water. The spring element includes two significantly different resistances to crushing when subjected to compressive loading including an initial resistance during which significant energy is absorbed. The spring element is also provided on the carrier barge between the barge and the deck module so that if the carrier barge should reengage the module once the transfer has been started, damage will be inhibited.

25 Claims, 3 Drawing Sheets

FIG. 2
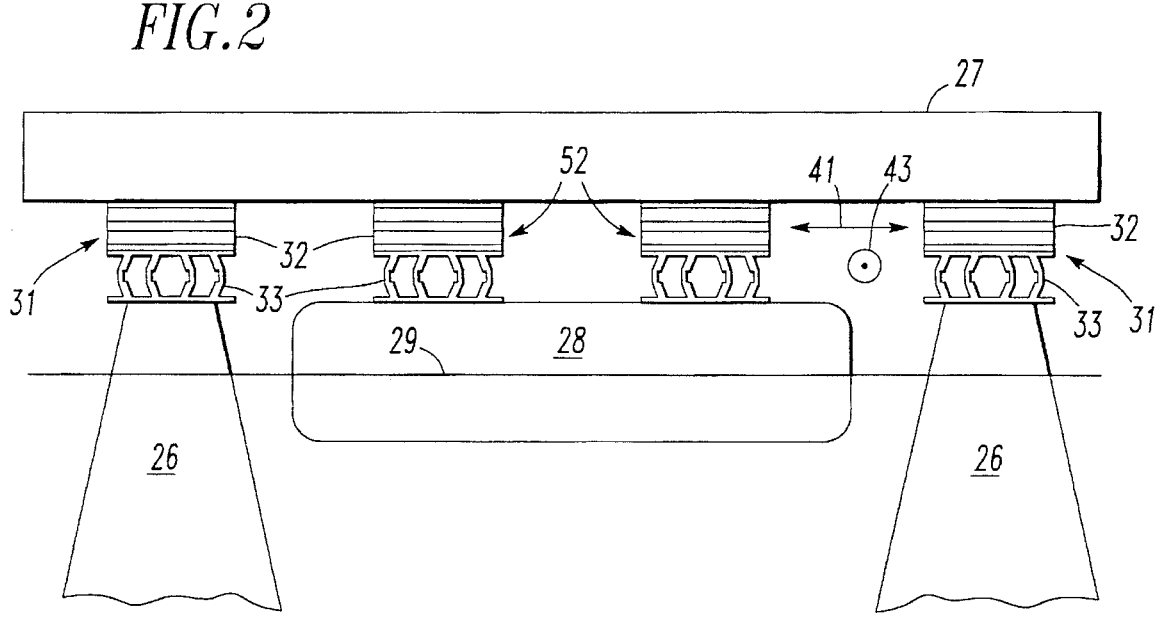
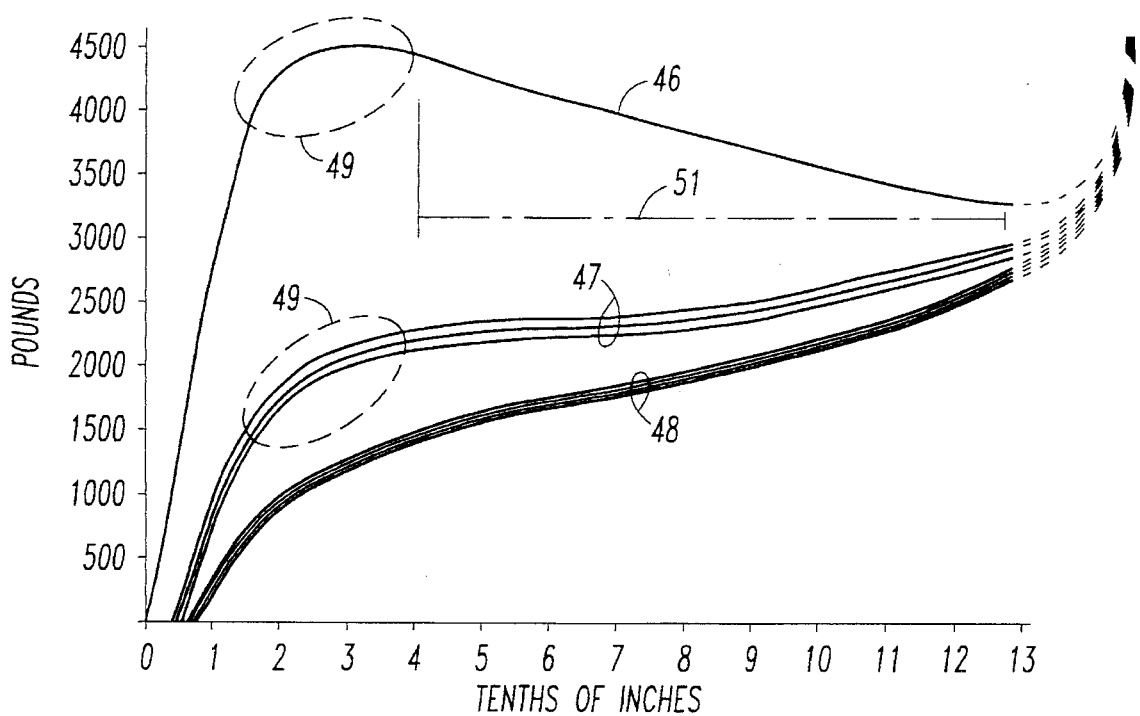
FIG. 6

OFF-SHORE PLATFORM CONSTRUCTION, AND METHOD FOR TRANSFERRING LOADS

BACKGROUND OF THE INVENTION

The present invention relates to transferring massive loads between objects and, more particularly, to such a transfer during relative movement between objects.

Off-shore well platforms are commonly used to extract crude oil, natural gas and/or other hydrocarbons from the earth beneath a body of water. Such platforms are relatively massive structures designed often to support not only the equipment for the actual drilling or extraction but also living quarters for a crew, hydrocarbon processing equipment, helicopter landing pads, cranes for transferring supplies and other material between the same and cargo ships, etc.

Each platform generally is made up of two major parts, one of which is a deck which supports the derrick and other components desired to be maintained at the surface of the body of the water. The other major part is a base which supports the deck and is either directly connected to, or tethered to, the earth at the platform location. A fixed structure providing a base typically is referred to in the art as a jacket, whereas one that floats and is tethered referred to as a hull.

The base of an off-shore platform generally is made first and the deck then assembled to the same in parts or modules. This construction is both time consuming and quite complex. Part of this is due to the waves and currents in the body of water. It will be seen that the uncontrolled motion represented by the same can interfere greatly with the transfer of the deck modules to the base. While such uncontrolled motion is generally cyclical in nature, it is sufficiently random that the amount of potential dynamic loading which might be experienced between a deck module, a deck module carrier (floating barge) and/or the base during transfer has severely restricted the mass of deck modules which can be transferred. (While as stated the mass of possible deck modules is severely restricted, this is relative—deck modules having a weight of over 9,000 tons are transferred by prior art techniques.) This random motion includes both a vertical component and a lateral component.

The problem is particularly acute when the base itself is subjected to wind, wave or current motion. In this connection, because of the difficulty associated with constructing a platform at the extraction or, in other words, the production location, in some instances in which there is a calm body of water in direct communication with the final location desired for the platform, e.g., a Norwegian fjord and the North Sea, it is common to assemble the same as a floating structure in the calm body of water, then to tow the platform to the borehole site to be tethered. It should be mentioned that some of these calm bodies of water, such as many Norwegian fjords, are calmer than lakes of a comparable size, and this "preassembly" technique is often preferred if it is practical.

In efforts to overcome the construction hurdle associated with water motion, those in the art have used large separate crane ships to transfer deck modules to bases. Such crane arrangements are even used in relatively calm bodies of water in order to increase the size of deck modules which can be assembled on a towable base. Even when a crane arrangement is used, it is necessary to include large shock absorbing structures, such as bulk elastomers, crushable foams, aluminum cylinders (in essence, aluminum "culverts"), sand or hydraulic systems, to prevent damage due to high impact loads. Floating cranes that are suitable are very costly, limited in capacity, and only can be used during relatively calm sea states.

As off-shore platforms become larger and heavier, the problem of being limited in the size of the deck modules which can be transferred to bases becomes even more of a limitation. Heavier decks, or deck modules, have greater masses, and higher dynamic loads are potentially experienced because of the relative motion. Also, larger decks often have major overhangs which amplify the relative motion at their outboard edges and the resulting load which can be experienced at the deck support points.

Significant resources have been spent in an effort to overcome the construction hurdle caused by water motion. It has been proposed that a barge or the like carrying a deck module be maneuvered between the supporting structures of a base so that parts of the module are above the supports. The barge is then lowered in the water, with the result that the deck module itself is "transferred" to the base. An example of such an arrangement is that described in U.S. Pat. No. 4,662,788. A difficulty in the past, though, is that arrangements which have been designed have not taken into account the lateral (linear and torsional) shear loading which is caused by relative motion between the carrier and the base during the transfer. It will be obvious, for example, that the stabbing pins included in the arrangement disclosed in the above-mentioned patent, cannot withstand any significant shear loading. While lateral motion can be minimized by tethering and the like, it has been found that as a practical matter it cannot be eliminated altogether. The failure of many to take shear loading into consideration is not altogether surprising in that the desired transfer motion is only longitudinal.

One other problem which has prevented this technique from being used in any situation other than one in which the waters are quite calm, is the risk that the relative motion during the transfer may cause the carrier to strike or reengage the deck module after initial disengagement but before the transfer is completed and/or the carrier is moved away. Again, prior arrangements have not taken this possibility into consideration.

SUMMARY OF THE INVENTION

The present invention has as a goal the efficient transfer of large loads between a pair of objects or articles that are expected to experience relative motion during the transfer, such as between a deck module carrier and a platform base during the construction of an off-shore platform. The method of the invention includes using specialized springs at the locations at which it is expected the load will contact the object to which it is being transferred.

As a major feature of the invention, the springs are made up of spring elements selected to resist shear loading as well as to absorb the compressive loading which is expected. Such spring elements most desirably are also selected to have a relatively constant capability of accepting compressive loading over a significant range of the deflection expected to occur during the transfer. This feature limits the impact deceleration of the deck on the platform base during assembly. The spring elements that are selected preferably have a wide hysteresis for the absorption of energy. Such elements most desirably are also selected to have sufficient creep to provide direct contact between the load and object to which it is transferred, sometime after the transfer is completed.

It has been found that very appropriate springs are ones made up of spring elements having a plurality of longitudinal struts individually configured to respond to a compressive load by buckling in a predetermined direction. Such struts not only enable the elements to absorb compressive loading, but also resist shear loading. Most desirably, the struts of the spring elements are oriented relative to one another in materially different directions. The result is that the longitudinal struts will resist the shear loading in all of such materially different directions.

Spring elements of this nature have been designed in the past for certain military operations to absorb significant amounts of energy expected to be released over a very short period of time. These spring elements as used in the past, though, have had basically only one crush resistance when subjected to the expected load. In keeping with the invention, a spring element of this type is provided having two significantly different resistances to crushing. Moreover, it has been found that the ability of this type of spring element to resist shear loading is quite important in load transfer operations.

Most desirably, spring elements of the invention are provided at both the positions to be contacted on the object to which the load is to be transferred, such as a platform base, and at the locations on the object or article from which the load is to be transferred, such as the deck module carrier. The springs of the invention will then provide protection for both objects, thus enabling a transfer operation to be conducted in heavier seas than in the past and/or to conduct the transfer operation with heavier modules. Even in light seas or in other calm bodies of water, the provision of the springs to provide protection for both objects enables more risk-free transfers.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 2 is an enlarged schematic side elevation view of a transfers of a deck module to a deck base;

FIG. 6 is a graph representing the envelope of deflection vs. load and hysteresis of the preferred spring element of the invention.

DETAILED DESCRIPTION OF THE PREFERRED EMBODIMENT(S)

The following relatively detailed description is provided to satisfy the patent statutes. It will be appreciated by those skilled in the art, though, that various changes and modifications can be made without departing from the invention.

Figure 1:
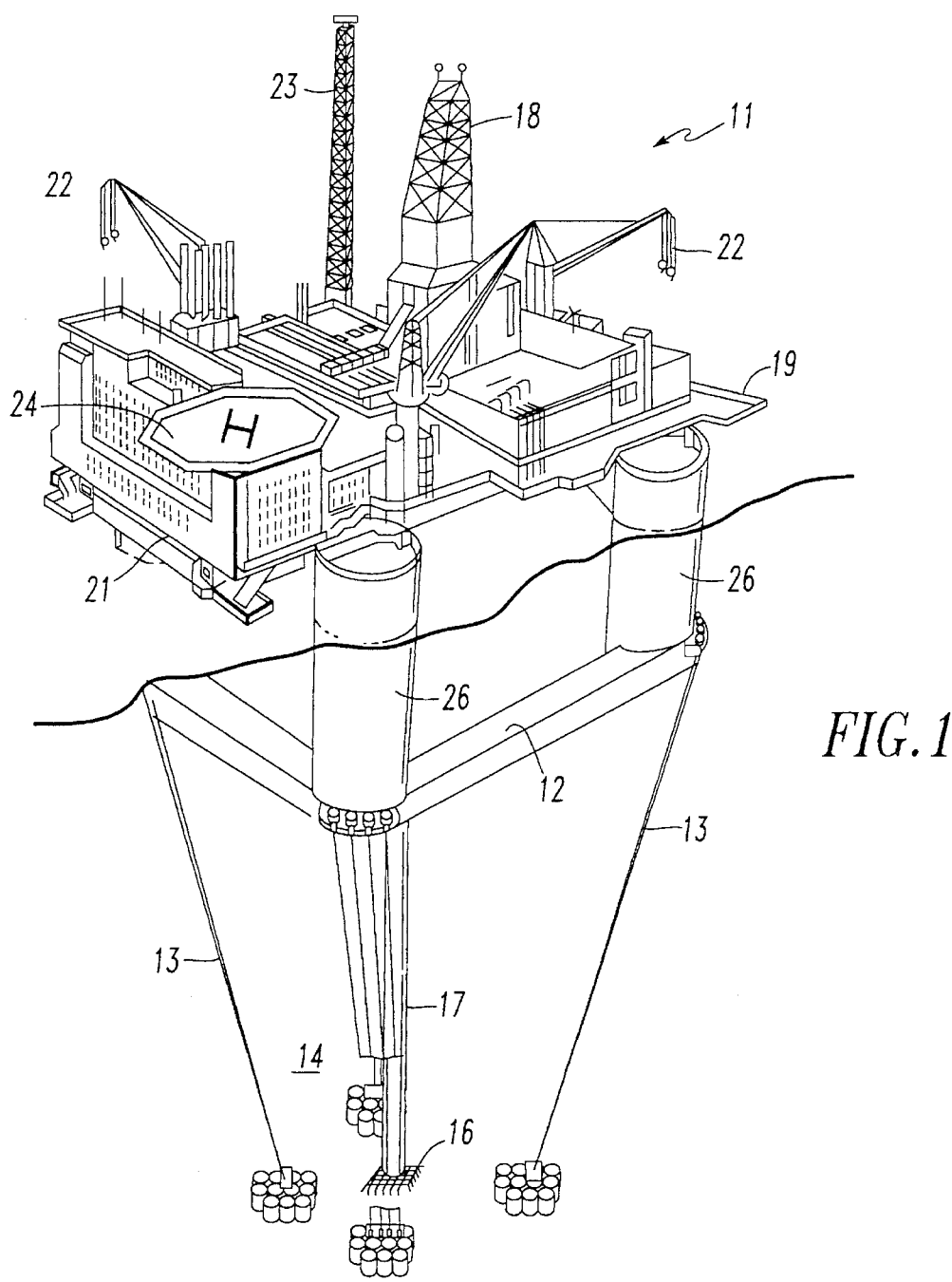
FIG. 1 is a broken-away isometric and generally schematic view of an oil well platform constructed in accordance with the method of the invention.

An off-shore well drilling platform to provide perspective on the instant invention is illustrated in FIG. 1. Such platform 11 includes a base in the form of a floating hull 12 which is tethered as indicated by tethering cables 13 to a sea bed 14 at the location at which the borehole(s) or well(s) is provided. [Although the platform 11 is described as being tethered by cables 13, it will be recognized that other tethering means, such as chains or tubular structural elements, could also be used. Moreover, platforms of this nature for both drilling or production are often referred to generically in the art as "tension leg platforms" (TLP's).] In this connection, a linear string of drill risers 17 are illustrated extending from the collection point 16 on the sea bed 14 upwardly to the platform deck 19. Although at times a platform is used for only one borehole, as a practical matter it is common to have one platform used for a multiple number of boreholes for extracting flowable substances from the earth. The same platform may be designed and placed for use with boreholes which respectively enable the extraction of differing substances, e.g., crude oil and a gas. Moreover, a platform may be designed and placed for use with boreholes which insert a material into the earth below the seabed, with or without other boreholes on the same platform, enabling extraction.

As can be seen, the deck 19 is a massive structure. It includes many different parts including, for example, crew living quarters and offices represented at 21, cranes 22, antenna 23, a helicopter landing pad 24, etc. A deck of this type is constructed by assembling various deck modules on upwardly extending base support structures, such as the towers 26. (It will be recognized that in some instances a deck module that is being installed will interface with already assembled deck modules rather than directly with the base as such base is originally constructed. The installation of such a deck module is, however, an indirect installation on the base supporting structure and the claims are meant to encompass such an arrangement.)

As mentioned earlier, during construction of the platform it is quite a complex and difficult operation to transfer the deck modules to the base. This problem is made acute by the relative motion between the two, caused because of the natural current and wave motion of the sea, and the varying response to the same by the base structure and carrier. This varying response is due to many factors, including the fact that the base support structure and the deck module carrier are at differing vertical elevations and may have differing hull forms and, of course, differing masses.

Part of the complexity relative to the transfer operation is due to the lateral component of the relative motion. While tethering and speedy transfers can reduce its effect, the possibility of lateral motion places severe limitations on the size of modules which can be transferred at any one time. The desire to provide ever increasingly greater sized modules exceeds the capabilities of conventional approaches to assembling off-shore well platform decks.

FIG. 2 is a schematic illustration representing a preferred mode of transferring a deck module to a base. Although from the broad standpoint this mode is not new, it has not been widely used or adopted. One reason for this is the failure of the specific systems developed in the past both to absorb the energy due to the compressive loading and to resist shear loading satisfactorily. The base supporting structure is represented by towers at 26, and a deck module to be transferred is represented at 27. The deck is positioned on a floating carrier or barge 28 which is first maneuvered between the towers 26 or to the other location at which the deck is to be transferred to the base. In this connection, the deck is initially high enough as shown to clear the towers. The barge is then lowered in the water, the surface of which is represented at 29, to engage the springs 31.

Figure 3:
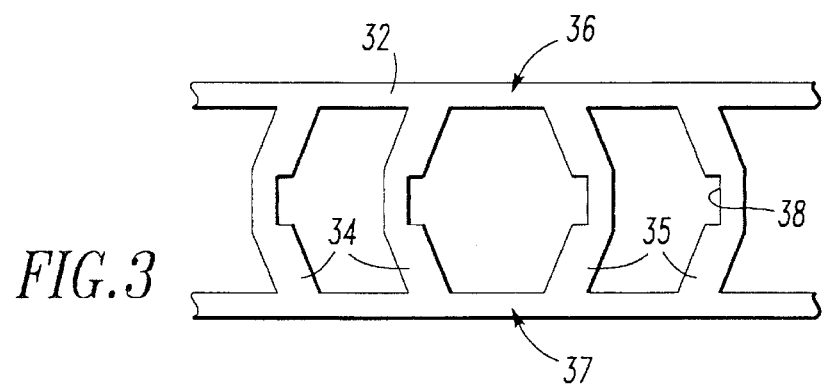
FIG. 3 is an enlarged fragmentary elevational view illustrating the configuration of a preferred embodiment of a strut spring element of the invention.

Each of the springs 31 is made up of a plurality of spring elements 32,33, a portion of a representative one of which is enlarged and shown in FIG. 3. As illustrated, each spring element includes a plurality of struts 34 and 35 which extend between a pair of opposed and generally parallel support face sheets 36 and 37. The struts 34 and 35 are oriented relative to one another to buckle in opposite directions, i.e., in materially different directions. In this connection, each strut is, in essence, a chevron in section. That is, the configuration of each is a "prebuckled" one, and its response to compressive loading is easy to control and direct. More particularly, each strut 34 and 35 is angularly related to the face sheets between which it extends, the direction of the angular relationship at the opposite ends of the strut being the same. Most simply from the constructional and analysis standpoint, the angles at the opposite ends of the strut (and for all of the struts) are made to be the same value.

Most desirably, struts of each spring element extend in opposed directions as illustrated in order to assure that the response of the full spring element to a compressive load will not itself cause unbalanced motion. This provision of struts in opposed directions is evident from both FIGS. 2 and 3.

Each of the struts also preferably includes a notch 38 or a similar geometrical discontinuity which aids in initiating and controlling the direction of compression of such strut. The configuration of such discontinuities can be tailored for these purposes. The thickness of each of the struts also is an important variable that can be selected to provide a desired tailored response to a compressive load. The length or height of the struts as seen in section is another variable which can be appropriately selected dependent upon the expected compressive load. The distance between the struts also affects the desired response of a spring element to a compressive load. An expectation of operation in heavy seas can be accommodated with longer stroke springs or a combination of springs in series. Higher weights can be accommodated with higher plateau levels and/or more spring area. Parallel spring arrangements also add to the load capacity of the system.

Each spring element preferably is molded as a one piece unit from a material which is compliant and will respond to compression in a known manner. Such material is preferably a resilient elastomeric material such as polyurethane, fluorocarbon, silicone, ethylene propylene diene monomer (EPDM), natural rubber, chlorinated polyethylene, or polyisoprene. It has been found that a specific formulation in which polyurethane is the dominant material is best, which formulation is disclosed in detail in U.S. Pat. No. 4,604,940, issued Aug. 12, 1986 to Mendelsohn et al. It is preferred from a practical standpoint that the dominant material of the strut be polyurethane—however, depending on the situation, it is recognized that other materials may offer more cost effective alternatives.

Figure 4:
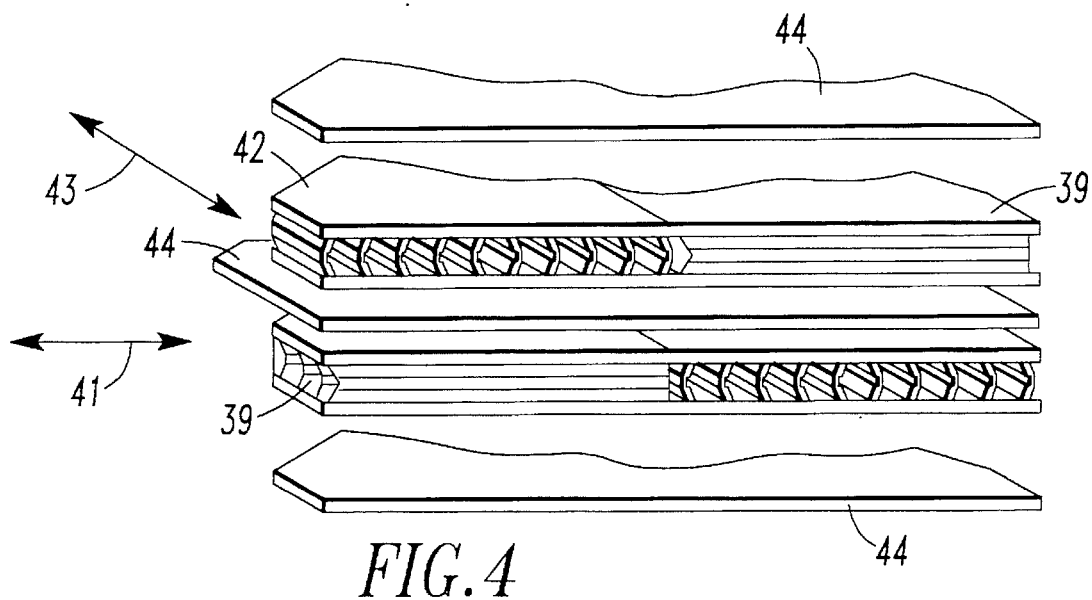
FIG. 4 is an exploded and fragmentary isometric view illustrating a preferred embodiment of a spring of the invention made up of the spring elements of FIG. 3.
Figure 5:
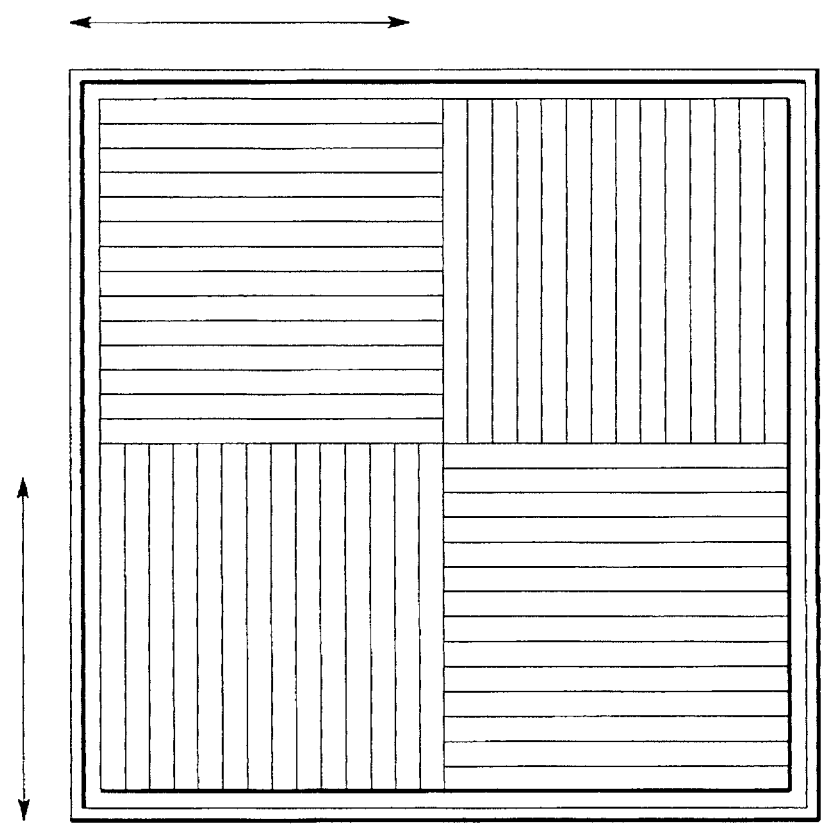
FIG. 5 is a top elevation view of a spring construction of the invention.

As a salient feature, the spring element of the invention also resists shear (linear and torsional) loads. That is, each spring element will resist any such shear load component which is in the direction of the longitudinal length of its struts, i.e., into or out of the paper in FIG. 3. Moreover, each of the springs 31 is made up of a plurality of spring elements 32 extending in materially different directions. FIG. 4 shows such an arrangement in an exploded view. The spring elements are square and in each level or layer there is a spring element 39 in which the struts extend longitudinally in the direction of the arrow 41 and, hence, resist any shear loading component in such direction. Each layer also includes spring elements 42 in which the struts extend in the direction 43 to resist shear loading in such direction. These two elements in each layer will thus provide the spring in such layer with at least four struts compressible in four orthogonally related directions. FIG. 5 is an elevation view showing a typical arrangement of the struts in orthogonal directions. Other combinations of strut orientation are possible to provide, for example, variation in resistance to shear loading in any direction.

The spring elements are stacked on top of one another as illustrated in the direction of expected compressive loading. It will be seen that the construction of the springs 31 from individual spring elements in this manner results in the desired resistance to shear loading. As illustrated in FIG. 4, each spring further preferably includes a pair of outside cover plates 44. These face plates act, in essence, as supports which are positioned to transmit energy from the module when it is being transferred to the struts.

As mentioned before, the spring elements of the invention (and, hence, the springs 31) absorb energy when they are subjected to compressive loading. The above is best illustrated by the graph of FIG. 6 which shows envelope curves of representative expected deflection versus loading for a spring element of the invention. Line 46 represents the response of a spring element of the invention to initial compressive loading, whereas lines 47 represent the response to all subsequent loadings. The lines 48 represent the response of the spring element to removal of the loading.

The fact that the first response (line 46) results in a significant absorption of energy is quite important from the invention standpoint. It is during the initial contact of the deck component with the base that much of the deck component weight is transferred. In this connection, the transfer is completed relatively fast so as to reduce the likelihood that wave motion or swells will reintroduce the energy into the deck module. (Although as mentioned above the spring element is basically the same spring element developed for a military application, insofar as the inventors are aware, in all previous applications of this spring element initial testing at the factory has precluded use of the first loading characteristic of the spring element and its efficacy neither was recognized nor was it inherent in the spring elements that left the factory.)

As shown in FIG. 6, there is a nearly linear increase in loading at the beginning or start of compression, e.g., during the first 10–15% of loading. This linear increase is similar to the reaction of a helical spring to compressive loading. This beginning reaction is driven by the loading required to initiate buckling of the struts and is a function primarily of strut angle and elastomer thickness. The similarity of the reaction of the spring element to that of a helical spring stops here. There is a "knee" 49 in each of the curves. Although selection of the criteria mentioned above aids in determining the abruptness of the "knee" of the curve (which knee is represented by the portion of the curves 46 and 47 encircled at 49), the notch or similar discontinuity configuration in its dimensions are important aspects in determining its degree of curvature.

The spring element has a relatively constant capability of accepting compressive loading over a significant range of the deflection expected during a transfer. This range is represented in FIG. 6 by the lines 51. It will be noted that this range is provided both in the first loading as well as in all subsequent loadings. As mentioned earlier, this feature limits the impact deceleration of the deck on the platform base during assembly. It will be noted that after reaction to the first loading as is represented by line 46, the spring element then will react to all subsequent loadings in basically the same way as is represented by lines 47. The close grouping of lines 48 also represents the common reaction to removal of the compressive loading. It will be noted that such removal also exhibits a plateau of reaction whose range is essentially the same as the plateau ranges represented by distance 51.

It is to be noted that the loading versus deflection curves of FIG. 6 represent typical envelopes rather than actual reaction to loading. The curve 46 represents the initial reaction to loading, all of which reaction may not necessarily be triggered by the very first compressive loading applied to the spring element. For example, if the first loading only subjects the spring element to 3500 pounds, the spring element will react for initial loading above 3500 pounds as represented by line 46 rather than line 47.

A major feature of the spring elements insofar as the present invention is concerned is their ability to creep over time. This means that after they have been subjected to compressive loading for some time after the transfer, the springs will, in essence, be crushed and the deck module can be secured in place via bolting, welding, etc.

It is preferable that the springs of the invention be positioned at one or more spaced locations at which a deck module may engage the base during the transfer. For example, as shown in FIG. 2, springs 31 are provided on both of the towers. Most desirably, the springs are provided at least at three spaced locations so as to be subjected to all shear components caused by torsional shear. These spaced locations preferably are spaced generally the same radial distance from the center of gravity of the deck module for balance.

As another significant feature, springs made up of spring elements of the invention are provided not only at the locations at which the deck module is to be transferred to the base, but also between the deck module and the barge or other carrier. For example, with reference to FIG. 2 it will be seen that the springs 52 are so located. Such springs typically are provided on the barge at the time the deck module is first loaded on the barge. Thus, if a wave or swell causes the barge itself to raise up and reengage the deck module as the deck module is unloaded, such reengagement will be cushioned.

As mentioned at the beginning of the detailed description, Applicant is not limited to the specific embodiment described above. Various changes and modifications can be made. For example, while the invention is described in detail in connection with the construction of a tension leg platform, from the broad standpoint it is equally applicable to a jacket type that is rigidly connected to the sea floor. Also, the term "tower" as used herein and in the claims is meant to encompass any support structure associated with a base to which it may be desired to transfer a deck module from a relatively moving barge or other object.

The description is exemplary, rather than exhaustive. The claims, their equivalents and their equivalent language define the scope of protection. It will be recognized that from the broad standpoint the invention is applicable to the transfer of a load from any carrying article to an object when it is conjectured that there may be relative movement between the article and the object during the transfer. Moreover, while the specific embodiment relates to extraction of hydrocarbons from beneath a sea, platforms for this purpose are sometimes used to inject water and gas into the sea to enhance the extraction. It will also be recognized that the invention is as equally applicable to a platform for injecting a water and gas, as a platform for extracting the same. As used in the claims, the term "extract" in its various forms is meant to include injection as well.

What is claimed is:

1. In a method of transferring a load from a carrying article to an object when it is believed there may be relative movement between the article and said object during the transfer, the steps of:

selecting a spring element capable of resisting shear loading and having a relatively constant capability of accepting compressive loading over a significant range of the deflection expected during said transfer, said spring element being made up of a plurality of struts of elastomeric material which are individually configured to respond to compressive loading by buckling in a predetermined direction;

positioning said selected spring element at a location at which said load is to contact said object during said transfer; and using said spring element during said transfer to engage said object.

2. The method of claim 1 wherein said step of positioning includes positioning a plurality of said selected spring elements at a respective plurality of spaced locations at which said load is to contact said object during said transfer.

3. The method of claim 1 wherein said step of selecting includes selecting a spring element for said positioning having sufficient creep to provide direct contact between said load and the object to which it is transferred after such transfer.

4. The method of claim 1 further including the step prior to said step of using, of positioning selected spring elements on said article at one or more locations at which said load may engage said article during said transfer.

5. The method of claim 1 wherein a plurality of said spring elements are selected, and said step of positioning includes positioning each of said spring elements with its struts oriented relative to those of other spring elements to buckle in one or more materially different directions.

6. In a method of constructing a platform for use at a location within a body of water to extract a flowable substance from the earth beneath said body of water, the steps of:

(A) providing a support structure for a deck component of said platform, which support structure includes at least one tower for supporting said deck component at a particular location relative to the surface of said water body;

(B) selecting a spring element capable of resisting shear loading and having a relatively constant capability of accepting compressive loading over a significant range of deflection, said spring element being made up of a plurality of struts of elastomeric material which are individually configured to respond to compressive loading by buckling in a predetermined direction;

(C) positioning said selected spring element at a location on said tower at which said deck component is to be engaged by said tower during transfer of said component to said tower;

(D) positioning adjacent said tower in said body of water, a carrier having said deck component; and (E) using said spring element during said transfer of said deck component from said carrier to said tower at the location of said spring element to absorb energy caused by movement of said component between said carrier and said tower.

7. The method of claim 6 wherein said step of positioning a carrier adjacent said tower includes floating said carrier on said body of water.

8. The method of claim 6 wherein said step of positioning said selected spring element includes positioning a plurality of said selected spring elements at a respective plurality of spaced locations at which said component is to contact said support structure during said transfer.

9. The method of claim 6 wherein said step of selecting includes selecting a spring element for said positioning having sufficient creep to provide direct contact between said component and said support structures after said transfer.

10. The method of claim 6 wherein said step of selecting includes selecting a plurality of said spring elements, and said step of positioning includes positioning said individual elements with the struts of at least some of said elements oriented relative to those of other elements to buckle in one or more materially different directions.

11. The method of claim 6 further including prior to said step of using, of positioning another selected spring element on said carrier at a location at which said deck component is supported during said transfer.

12. In a method of constructing a platform for use at a location within a body of water to extract a flowable substance from the earth beneath said body of water, the steps of:

(A) providing a support structure for a deck component of said platform, which support structure includes at least one tower for supporting said deck component at a particular location relative to the surface of said water body;

(B) positioning a selected spring element at a location on said tower at which said deck component is to be contacted by said tower during transfer of said component to said tower, said selected spring element having a relatively constant capability of accepting compressive loading over a significant range of the deflection that is expected and being made up of a plurality of struts of elastomeric material which are individually configured to respond to compressive loading by buckling in a predetermined direction;

(C) positioning adjacent said tower in said body of water, a carrier having said deck component;

(D) positioning another spring element on said carrier at a location at which said deck component is supported during said transfer; and (E) using said spring elements during said transfer of said deck component from said carrier to said tower.

13. The method of claim 12 wherein said step of positioning a carrier adjacent said tower includes floating said carrier on said body of water.

14. The method of claim 12 wherein said step of positioning a selected spring element includes positioning a plurality of said selected spring elements at a respective plurality of spaced locations at which said component is to contact said support structure during said transfer.

15. The method of claim 12 wherein said step of selecting includes selecting a spring element for said positioning having sufficient creep to provide direct contact between said component and said tower after said transfer.

16. The method of claim 12 wherein said step of positioning a selected spring element includes selecting a plurality of said spring elements, and positioning the individual elements with the struts of each element oriented relative to those of other elements to buckle in one or more materially different directions.

17. The method of claim 12 further including prior to said step of using, of positioning another selected spring element on said carrier at a location at which said deck component is supported during said transfer.

18. In a method of transferring a load between a pair of structures in a body of water, at least one of which is floating during the transfer, comprising the steps of:

(A) selecting a spring element capable of resisting shear loading and having a relatively constant capability of accepting compressive loading over a significant range of expected deflection, said spring element being made up of a plurality of struts of elastomeric material which are individually configured to respond to compressive loading by buckling in a predetermined direction;

(B) positioning said selected spring element on the one of said structures to which said load is to be transferred at a location at which said load is to contact said structure during said transfer; and (C) using said spring element for said transfer to absorb energy caused by relative movement between said structures, including energy caused because at least one of said structures is floating on said body of water.

19. The method of claim 18 wherein said step of positioning said selected spring element includes positioning a plurality of said selected spring elements at a respective plurality of locations at which said component is to contact said support structure during said transfer.

20. The method of claim 18 wherein said step of positioning said selected spring element includes selecting a spring element for said positioning having sufficient creep to provide direct contact between said component and said tower after said transfer.

21. The method of claim 18 further wherein said step of positioning said selected spring element includes selecting a spring element having a relatively constant capability of accepting compressive loading over a significant range of expected deflection.

22. The method of claim 18 wherein there are a plurality of said spring elements and struts of said spring elements are oriented relative to one another to buckle in materially different directions.

23. The method of claim 18 further including prior to said step of using, of positioning another selected spring element on said carrier at a location at which said deck component is supported during said transfer.

24. A method of constructing a platform for use at a location within a body of water to extract a flowable substance from the earth beneath said body of water, the steps of:

(A) providing a support structure for a deck component of said platform, which support structure includes at least one tower for supporting said deck component at a particular location relative to the surface of said body of water;

(B) providing a plurality of springs, each of which is made up of a plurality of spring elements having a pair of opposed and spaced generally parallel support plates between which a plurality of chevron-shaped struts extend, at least two struts of each spring element being oriented in opposite directions;

(C) positioning said springs at locations on said support structure at which said support structure is to be engaged by said deck component during transfer of said component to the same;

(D) positioning a plurality of springs on a carrier for said deck component at locations at which said deck component is supported during said transfer;

(E) positioning said carrier adjacent said tower in said body of water; and (F) using said springs during said transfer of said deck component from said carrier to said support structure to absorb energy caused by movement of said component between said carrier and said support structure.

25. The method of claim 24 wherein said step of providing springs made up of a plurality of spring elements having struts extending between the plates, includes providing such springs in which each strut includes a notch which aids in directing buckling of the strut in a predetermined direction.

* * * * *